Nov. 3, 1964    R. E. SWARTS    3,155,477
METHOD OF FABRICATING INTRICATE INTERNAL SHAPES
Filed Aug. 25, 1961
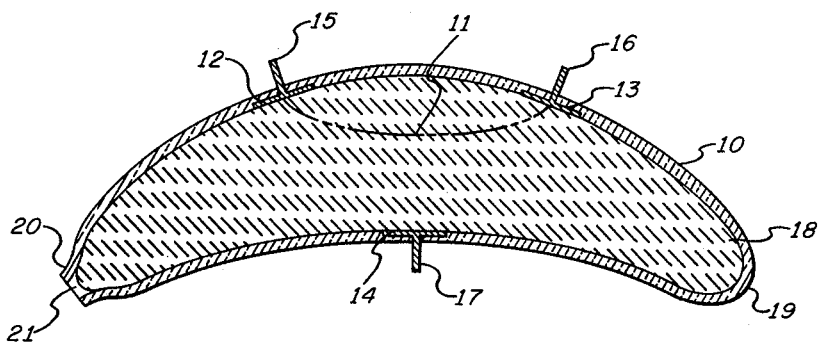
INVENTOR.
RICHARD E. SWARTS
BY
ATTORNEY United States Patent Office 3,155,477
Patented Nov. 3, 1964

3,155,477
METHOD OF FABRICATING INTRICATE
INTERNAL SHAPES
Richard E. Swarts, Northport, N.Y., assignor to Sperry Rand Corporation, Great Neck, N.Y., a corporation of Delaware
Filed Aug. 25, 1961, Ser. No. 133,961
4 Claims. (Cl. 65—23)

The present invention relates to a method for fabricating intricate shapes within the interior of structures particularly where a mandrel is required to form the desired shape but the mandrel cannot be removed in one piece after the structure is formed.

The invention will be described with respect to fabricating a liquid level of the type used for gyroscopic instruments for purposes of example since the interior of the liquid level must be formed extremely accurately and in certain cases after it is formed the mandrel cannot be removed from the interior of the liquid level.

A common method for fabricating simple internal shapes in glass is to shrink the glass onto a mandrel by heating the glass and then evacuating the air around the mandrel which causes the heated glass to shrink and conform to the mandrel configuration. The mandrel is withdrawn from the interior of the glass structure when the glass and mandrel have cooled. It is obvious that this process cannot be used for intricate shapes where the mandrel cannot be removed.

It is therefore a primary object of the present invention to provide a method whereby an intricate shape can be formed in the interior of a structure by means of a mandrel in which the mandrel is removable.

It is an additional object of the present invention to provide a method whereby an intricate shape can be formed in the interior of a structure by means of a mandrel in which the mandrel is porous in order that a gas can be exhausted therethrough and is of a material which can be removed from the interior of the finished structure.

The above objects are achieved by utilizing a mandrel that is porous in order that the gas within the interior of the structure may be exhausted through the porous mandrel thereby causing the interior of the structure to conform to the shape of the mandrel. Further, the mandrel consists of a material which may be washed out of the interior of the finished structure in lieu of removing it in one piece.

Referring to the drawings, a liquid level is shown having the removable mandrel disposed therein.

As shown in the drawing, a liquid level 10 of the type used in conjunction with gyroscopic instruments must have its interior precisely shaped in order that the movement of the electrolyte 11 shown in dotted lines as it cooperates with the contacts 12, 13 and 14 provides an electrical signal on respective leads 15, 16 and 17 that is representative of the movement of the liquid level 10.

In the manufacture of certain liquid levels, for example of the type shown in the drawing, the liquid level 10 has an internal shape that prevents removal of the mandrel 18 which is utilized to form the interior shape of the liquid level 10. The method of the present invention overcomes this problem by utilizing a porous and removable mandrel. The method of the present invention may be practiced as explained forthwith.

A stainless steel mold is formed having the desired interior contour of the finished structure. The mold is coated with a parting agent such as sperm oil. A slurry of a refractory material is prepared which is known as an investment when applied to precision casting. Since the investment will ultimately comprise the mandrel, it must be of a type that results in a porous and removable mandrel. A suitable material is known as Ransom and Randolph Investment 417 and may be obtained from Alexander Saunders and Co., 95 Bedford Street, New York, New York. The investment compositions disclosed in U.S. Patent No. 1,932,202 entitled Investment which issued October 24, 1933, are also suitable. An investment consisting of a slurry of 100 parts of an investment as disclosed in said U.S. Patent 1,932,202 consisting of, for example, cristobalite 50 parts, plaster of Paris 30 parts and tridymite and ordinary silica 20 parts to about 40 parts of water by weight is suitable. The mold is filled with the investment under a vacuum of 10 to 20 millimeters of mercury.

The filled mold is then permitted to stand one hour at room temperature. Thereafter the mold is placed in an oven at 80 to 90° C. for one hour to allow the excess moisture to be driven out of the formed mandrel. The mold is then parted and one of the two alternative procedures may then be followed:

(a) With the mandrel remaining in one-half the mold, it is cured at 800 to 900° F. for one hour. This drives off the volatiles, such as water vapors. However, the mandrel becomes quite brittle and extreme care must be used in subsequent operations. After this curing cycle the mandrel is removed from the mold.

(b) The alternative is to remove the mandrel from the mold without curing at the elevated temperatures. In this case, the mandrel is considerably stronger, i.e., less brittle. However, in the subsequent shrinking operation care must be taken to drive the volatiles such as water vapors, out of the mold before the actual shrinking of the glass structure takes place.

The glass structure from which the liquid level is to be made, which is usually glass tubing, is bent to a shape that substantially conforms with the mandrel while permitting insertion of the mandrel therein. When manufacturing liquid levels, holes are blown in the tubing for the liquid level contact leads 15, 16 and 17. The liquid level contact leads 15, 16 and 17 which have previously been glass beaded in a conventional procedure are then inserted with their contacts 12, 13 and 14 in their respective locations.

The mandrel 18 is then inserted into the interior of the glass tubing and aligned with the contacts 12, 13 and 14.

The glass structure including the mandrel 18 is placed on a glass blowers lathe and one end 19 of the liquid level 10 is closed off. The other end 20 of the liquid level 10 is connected by means of an opening 21 to a vacuum pump.

The gas within the liquid level 10 is exhausted through the porous mandrel 18 while the glass is heated to a plastic state thereby causing the interior of the glass structure to shrink and conform to the shape of the mandrel 18. The excess glass is drawn off as required for example, by hand in a conventional manner. The assembly is then cooled to room temperature. After cooling, the assembly is placed under running hot water at 190 to 200° F. in order that the water entering and leaving through the opening 21 washes, i.e. erodes, out the removable mandrel 18. If desired, before washing and after cooling, a portion of the mandrel 18 may be picked out through the opening 21 by means of a pointed tool to expedite the removal of the mandrel 18.

The washed out assembly is then placed in a conventional ultrasonic cleaner with water at 190 to 200° F. and cleaned until all traces of the mandrel 18 are removed in a conventional manner. The liquid level 10 is filled through the opening 21 with an electrolyte 11 and then the opening 21 is sealed to complete the fabrication of the liquid level 10.

In a process of the nature described, the mandrel should (1) Have a low coefficient of expansion or closely match that of the structure, (2) Form no bond with or have any undersirable effect upon the structure, (3) Provide a good surface finish, (4) Be readily removable from the construction, (5) Be porous, and (6) Be chemically inert with respect to the electrolyte in the event any of the mandrel is trapped and cannot be removed.

Further, in lieu of washing out the mandrel with water, it may be washed out with steam jets or other fluid depending upon the mandrel material.

When fabricating liquid levels, it may be desirable to grind the liquid level contacts flush with the interior glass in certain instances after the mandrel has been removed.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A method of fabricating intricately shaped structures including the steps of forming a porous mandrel of a material which is permeable with respect to gases and which may be washed out from the interior of the finished structure into the shape of the desired structure, forming the desired structure into a shape to permit insertion of the mandrel, inserting the mandrel within said structure, heating the structure around the mandrel to softness, said mandrel material maintaining a solid configuration during said heating, drawing a vacuum on the interior of the structure through the porous mandrel thereby causing the interior of the structure to conform to the shape of the mandrel, and washing out the removable mandrel from within the interior of the finished structure.

2. A method of fabricating intricately shaped glass or ceramic structures including the steps of molding a porous mandrel of a material which is permeable with respect to air and which may be washed out from the interior of the finished structure into the desired interior shape of the finished structure, forming the structure to a shape that partially conforms to the mandrel to permit insertion of the mandrel therein, heating the structure around the mandrel to softness, said mandrel material maintaining a solid configuration during said heating, inserting the mandrel within said structure, drawing a vacuum on the interior of the structure through the porous mandrel thereby causing the interior of the structure to assume the shape of the mandrel, and removing the mandrel by washing out the removable mandrel from within the interior of the structure.

3. A method of fabricating intricately shaped glass or ceramic structures including the steps of forming a porous mandrel of a material which is permeable with respect to air and which may be washed out from the interior of the finished structure into the desired shape of the interior of said structure, heating said structure to softness to permit it to be shaped, prebending said structure to a shape that permits insertion of the mandrel therein, inserting the mandrel within said structure, said mandrel material maintaining a solid configuration within said heated structure removing the gas from the interior of the structure through the porous mandrel thereby causing the interior of the structure to assume the identical shape of the mandrel, cooling the structure and material at room temperature, and removing the mandrel by washing out the removable mandrel from within the interior of the structure.

4. A method of fabricating intricately shaped glass structures including the steps of molding a porous mandrel of a refractory material which is permeable with respect to air and which may be washed out from the interior of the finished structure into the desired interior shape of the finished structure, heating said structure to permit it to be shaped, prebending the glass structure to a shape that permits insertion of the mandrel therein, inserting the mandrel within said glass structure, said mandrel maintaining a solid structure within said heated structure drawing a vacuum on the interior of the glass structure through the porous mandrel thereby causing the interior of the glass structure to assume the shape of the mandrel, cooling the glass structure and mandrel at room temperature, and removing the mandrel by washing out the material from within the interior of the glass structure.

References Cited in the file of this patent

UNITED STATES PATENTS

| | | |
|---|---|---|
| 2,084,811 | Keen | June 22, 1937 |
| 2,282,355 | Hannum | May 12, 1942 |
| 2,415,412 | Buchwald et al. | Feb. 11, 1947 |
| 2,935,579 | Fishman | May 3, 1960 |
| 3,091,104 | Morrill | May 28, 1963 |
| 3,091,105 | Morrill | May 28, 1963 |